US007835739B2

(12) United States Patent
Del Signore et al.

(10) Patent No.: US 7,835,739 B2
(45) Date of Patent: Nov. 16, 2010

(54) METHOD OF EXCLUDING INEFFECTIVE INTER SYSTEM PAGE ATTEMPTS

(75) Inventors: Kenneth W. Del Signore, North Aurora, IL (US); Harold R. Smith, Jr., Oakbrook Terrace, IL (US); La Sheral Smith, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 745 days.

(21) Appl. No.: 11/589,030

(22) Filed: Oct. 27, 2006

(65) Prior Publication Data

US 2008/0101316 A1 May 1, 2008

(51) Int. Cl.
H04W 4/00 (2009.01)
H04W 68/00 (2009.01)

(52) U.S. Cl. .................... 455/435.1; 455/433; 455/458; 455/426; 455/428

(58) Field of Classification Search ................. 455/458, 455/426, 428, 435.1, 433
See application file for complete search history.

(56) References Cited

U.S. PATENT DOCUMENTS

| | | | | |
|---|---|---|---|---|
| 5,533,094 A * | 7/1996 | Sanmugam | ............... | 455/426.1 |
| 5,918,177 A * | 6/1999 | Corriveau et al. | ......... | 455/432.3 |
| 6,058,308 A * | 5/2000 | Kallin et al. | .............. | 455/432.3 |
| 6,101,388 A * | 8/2000 | Keshavachar | ............. | 455/435.1 |
| 6,108,518 A * | 8/2000 | Madour et al. | .............. | 340/7.25 |
| 6,272,342 B1 * | 8/2001 | Havinis et al. | .............. | 455/433 |
| 6,285,880 B1 * | 9/2001 | Gagnon et al. | ........... | 455/432.1 |
| 6,542,476 B1 * | 4/2003 | Elizondo et al. | ............ | 370/278 |
| 7,366,526 B2 * | 4/2008 | Zhang et al. | ................. | 455/458 |
| 2002/0147010 A1 * | 10/2002 | Cruz et al. | .................. | 455/426 |
| 2004/0198349 A1 * | 10/2004 | Chin | ........................ | 455/432.1 |
| 2005/0181767 A1 * | 8/2005 | Boland et al. | ............. | 455/412.2 |
| 2006/0068813 A1 * | 3/2006 | Ku et al. | ...................... | 455/458 |
| 2007/0293245 A1 * | 12/2007 | Del Signore et al. | ........ | 455/458 |

* cited by examiner

Primary Examiner—Dwayne D Bost
Assistant Examiner—Chhean Thao
(74) Attorney, Agent, or Firm—Carmen Patti Law Group, LLC

(57) ABSTRACT

A method and apparatus are provided for excluding ineffective Inter System Page (ISPAGE) attempts in a mobile switching center (MSC). The present invention involves determining a time difference between an arrival time of an ISPAGE message and a time of a last seen activity of a mobile communications device. The ISPAGE message is dropped if the time difference exceeds an optimum time cutoff value. Also, the present invention provides a technique for determining the optimal time cutoff value by determining the fraction of all ISPAGE messages that may be dropped, and the fraction of all ISPAGE messages that produce page respones that will be admitted as a function of the optimal cutoff time value.

23 Claims, 4 Drawing Sheets

METHOD OF EXCLUDING INEFFECTIVE INTER SYSTEM PAGE ATTEMPTS

TECHNICAL FIELD

This invention relates to the art of wireless telephony, and more particularly to a method of excluding ineffective ISPAGE attempts in mobile switching centers.

BACKGROUND

In wireless communications, a part of the process of delivering a call to a mobile phone may involve the serving, i.e., last registered, mobile switching center (MSC) broadcasting a page message to all of the cells located within the last registered MSC's serving area. A cell is a basic geographic unit of a cellular system. Cells may be grouped geographically into two or more Location Areas (LAs). A cell includes a transmission tower that is generally centrally disposed within the cell, although multiple transmission tower locations may be supported to ensure adequate coverage, particularly in problem areas.

Page messages are radio frequency signals transmitted by some or all of the transmission towers associated with a MSC. Page messages are used by MSCs to locate and alert a specific mobile phone that there is a call for it. A first page attempt is generally sent by all of the transmission towers in the mobile phone's last seen location area. If the specific mobile phone successfully receives and responds to the page message with the proper acknowledgement message, then the call delivery process can continue.

If the mobile phone does not respond to the first page attempt, a larger area, known as a Location Area Cluster (LAC), may be paged during second and third page attempts. The LAC usually consists of every location area or MSC that borders the last seen location area. The last registered MSC will send Inter System Page (ISPAGE) messages to the border MSCs. The ISPAGE messages instruct border MSCs to transmit page messages intended for the mobile phone.

FIG. 1 shows an illustrative view of a network of MSCs. Typically, the first page attempt involves the last registered MSC, i.e., MSC 1, paging all of the cells in the last seen location area (LA), i.e., MSC 1 pages LA 2. The first page attempt usually results in a high response rate, i.e., page reception and response by the specific mobile phone. Second and third page attempts involve a) the last registered MSC, i.e., MSC 1, paging all of MSC 1's cells, i.e., MSC 1 pages LA 2 and LA 1, and b) border MSCs, i.e., MSC 2, MSC 3, MSC 4 and MSC 5, paging cells that border areas of the last seen location area (LA), i.e., MSC 2 pages LA 3, MSC 3 pages LA 5, MSC 4 pages LA 7, and MSC 5 pages LA 9 and LA 10. Second and third page attempts result in significantly lower response rates, e.g., approximately 5%.

The volume of calls that MSCs can deliver to mobile phones translates directly into revenue for a service provider. Disadvantageously, in large metropolitan markets, a MSC's paging resources may be the limiting factor that prevents the MSC from delivering a higher number of calls to mobile phones, thus reducing the revenue potential for the service provider. Also disadvantageously, the ISPAGE page mechanism produces a large percentage, i.e., approximately 50%, of the total page messages.

SUMMARY

It has been recognized, in accordance with the principles of the invention, that the problems of the prior art can be overcome by a method of excluding ineffective ISPAGE attempts. More specifically, the present invention provides an apparatus and method to assist MSCs in reducing the number of ineffective ISPAGE attempts to mobile phones by a) receiving an Inter System Page (ISPAGE) message to transmit a page message to a mobile communications device, b) retrieving a record of a time of a last seen activity of the mobile communications device, wherein the time of the last seen activity of the mobile communications device is stored regardless of a registration status of the mobile communications device, and c) determining a time difference between an arrival time of the ISPAGE message and the time of the last seen activity of the mobile communications device.

DETAILED DESCRIPTION

The present invention provides a technique for reducing the number of ineffective Inter System Page (ISPAGE) attempts made by mobile switching centers (MSCs) to mobile phones. Specifically, the present invention provides a technique for measuring a) the fraction of all ISPAGE messages that should be dropped by the MSCs and b) the fraction of all ISPAGE messages that produce a page response that may be attempted for an optimum time cutoff value.

Figure 1:
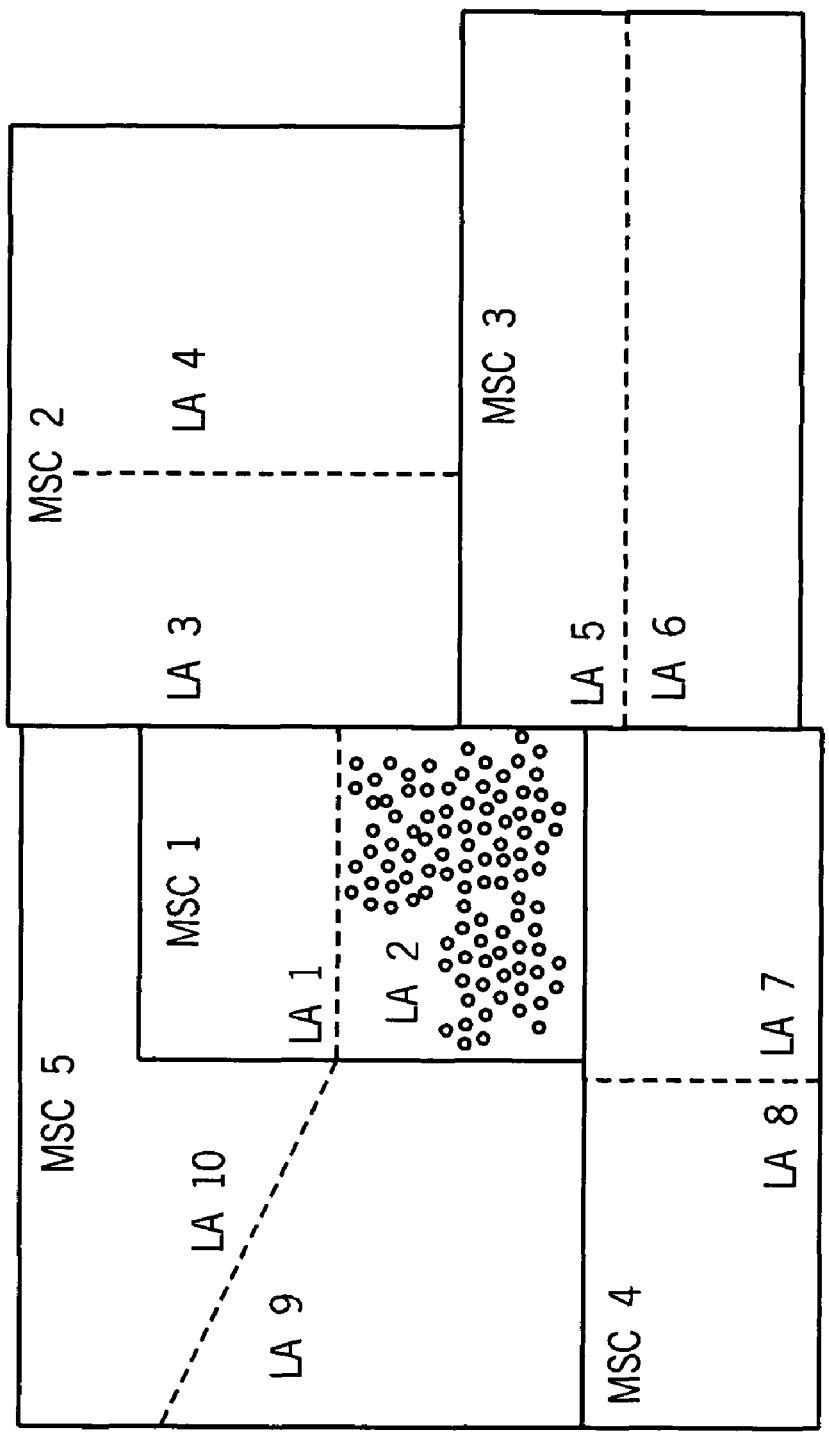
FIG. 1 shows an illustrative view of a network of MSCs.
Figure 2:
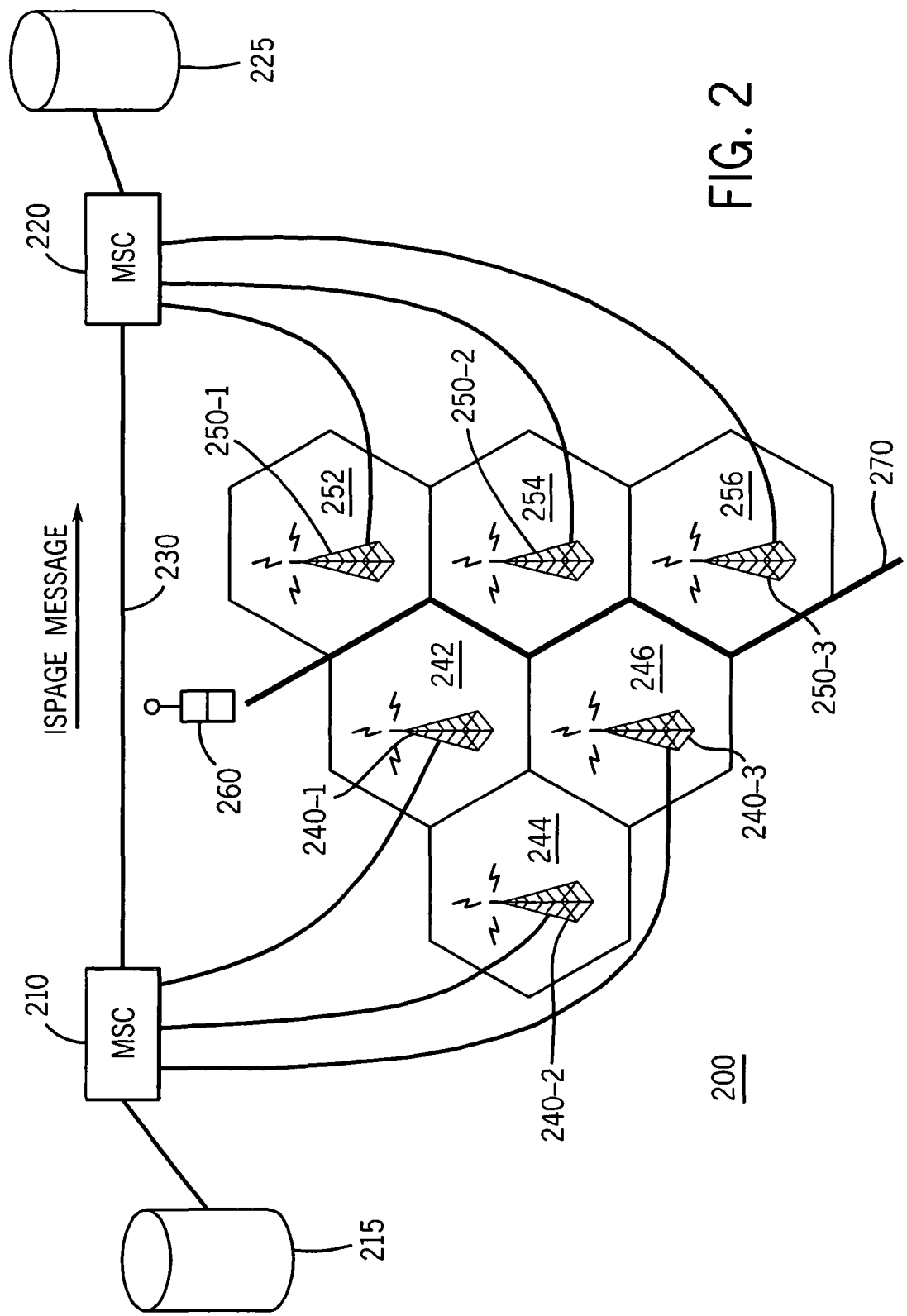
FIG. 2 shows an illustrative view of a method of excluding ineffective Inter System Page (ISPAGE) attempts arranged in accordance with the principles of the invention.

FIG. 2 is a diagram illustrating the method of excluding ineffective ISPAGE attempts arranged in accordance with the principles of the invention. As shown in FIG. 2, communications network 200 includes MSC 210 connected to MSC 220 via dedicated trunk 230. MSC 210 serves cells 242, 244, and 246, while MSC 220 serves cells 252, 254, and 256. Communications network 200 may include a much larger number of cells in actual practice. Each MSC is depicted as serving only three cells for the sake of simplicity. A dark line 270 in FIG. 2 symbolically represents the border region between cells served by MSC 210 and MSC 220.

FIG. 2 shows MSC 210 connected to base stations 240-1, 240-2 and 240-3, collectively hereinafter base stations 240. MSC 220 is connected to base station 250-1, 250-2, and 250-3, collectively hereinafter base stations 250. Also, MSC 210 is connected to data base 215 and MSC 220 is connected to data base 225. MSC 210 is the last registered MSC for mobile phone 260 which is located at border 270 between MSC 210 and MSC 220.

Mobile phone 260 is a mobile communications device capable of wirelessly connecting to communications network 200 via a telephone switching network having wireless technologies that may include one or more base stations, e.g., base stations 240 and base stations 250, connected to one or more mobile switches, e.g., MSC 210 and MSC 220, allowing a user of mobile phone 260 to communicate, via a user interface on mobile phone 260, with a caller, not shown. The user interface of mobile phone 260 may include an audio interface, such as a microphone and speakers, a visual interface, such as a display, and a user input interface, such as a keyboard or touch pad.

Mobile phone 260 may be operated in a given geographical area which may be a visiting area by which a subscriber roams into or the subscriber's home service area. Mobile phone 260 is capable of sending and receiving voice calls, email, short message service (SMS), microbrowser messages or text messaging. Mobile phone 260 may use an air interface standard such as Code Division Multiple Access (CDMA), Time Division Multiple Access (TDMA), Universal Mobile Telecommunications System (UMTS), Global System for Mobile Communications (GSM), etc., not shown, or any other standard or protocol which supports voice calls, email, SMS, microbrowser messages or text messaging. Mobile phone 260 may be capable of multi-band operation, i.e., two radio access technologies.

In one embodiment of the invention, mobile phone 260 may be a small, light-weight portable mobile telephone, e.g., pocket telephone. In another embodiment of the invention, mobile phone 260 may be a mobile telephone installed in an engine-driven vehicle and supplied with current from the vehicle electrical system. In an alternative embodiment of the invention, mobile phone 260 may be a personal digital assistance (PDA) device, a two-way pager or other suitable mobile communications devices.

Base stations 240 and base stations 250 are radio transmitters/receivers that maintain communications with mobile phones, e.g., mobile phone 260, within a given range, e.g., cells 242, 244, 246, 252, 254, and 256. Base stations 240 and base stations 250 may use an air interface standard that is complementary to the air interface standard of mobile phone 260 so that calls may be connected from mobile phone 260 to a mobile switching center, e.g., MSC 210 and MSC 220, which may connect the calls to the public switched telephone network (PSTN), not shown. Base stations 240 and base stations 250, in one embodiment, each comprise one or more of a Flexent® CDMA 450 MHz Modular Base Station (Lucent Technologies).

MSC 210 and MSC 220 are telecommunications switches capable of switching calls between a plurality of endpoints via a wireless network connected to the PSTN. MSC 210 and MSC 220 have call control components, not shown, that monitor all mobile phone calls within their serving areas, tracks the location of all mobile phone-equipped vehicles traveling within their service areas, arranges handoffs between switches, keeps track of billing information, etc. MSC 210 and MSC 220 are capable of broadcasting pages to mobile phones to alert the mobile phones of a call. Also, when delivering a call to a mobile phone in their respective serving areas, MSC 210 and MSC 220 are capable of sending ISPAGE messages to other MSCs to instruct the other MSCs to page a mobile phone, e.g., mobile phone 260. MSC 210 and MSC 220, in one embodiment, each comprise one or more of a 5ESS® 2000—Switch Mobile Switching Center (MSC) (Lucent Technologies).

MSC 210 and MSC 220 maintain separate data bases, e.g., data bases 215 and 225, having records, i.e., a time stamp, of all mobile phones that were recently seen by each MSC. In the present invention, the record of the last seen activity of the mobile phone includes the time that the mobile was last seen. As known by those of ordinary skill in the art, data base records of a mobile phone are typically deleted when the mobile phone de-registers. In the present invention, the time of the last seen activity of the mobile phone may be retained for a time period, e.g., 6 hours, after the mobile phone de-registers, and stored independently of the registration status of the mobile phone. Thus, the time of the last seen activity of the mobile phone may be stored regardless of whether the mobile phone is currently registered with the MSC or the mobile phone has de-registered. Also, the time of the last seen activity of the mobile phone may be stored in increments of 1 minute or less.

When mobile phone 260 does not respond to a first page attempt from the last registered MSC, i.e., MSC 210, then MSC 210 transmits an ISPAGE message to MSC 220 via dedicated trunk 230. After receiving the ISPAGE message, MSC 220 retrieves the time of the last seen activity of mobile phone 260 from data base 225. MSC 220 determines a time difference between an arrival time of the ISPAGE message and the time of the last seen activity of mobile phone 260. If the time difference is greater than an optimal cutoff value, MSC 220 drops the ISPAGE message, i.e., MSC 220 does not send page messages to any base stations within the coverage area of MSC 220. If the time difference is not greater than the optimal cutoff value, then MSC 220 proceeds to send the page messages intended for mobile phone 260.

Prior to enabling the dropping of the ISPAGE message feature, an interim state known as "study mode" may be used to determine the optimal time cutoff value. Two histograms may be created by software in the MSC to assist in determining the optimal cutoff value. The first histogram may show the time difference between an arrival time of all received ISPAGE messages and the time of the last seen activity of the mobile phone. In this histogram, all time differences are accumulated over a time interval, e.g., at least one day, to create the histogram and stored in a data base.

The second histogram may show the time difference between the arrival time of the received ISPAGE messages and the time of the last seen activity of the mobile phone only for instances when the mobile phone responds to the page message. Again, all time differences are accumulated over a time interval, e.g., at least one day, to create the histogram and stored in a data base. The results of the second histogram are illustrative of what may occur after the MSC transmits one or more page messages intended for mobile phones in response to the one or more ISPAGE messages, illustrating the number of ISPAGE messages responded to by the mobile phones.

A service provider may view a display and analyze the two histograms to determine the optimum time cutoff value by varying a predetermined time cutoff value until the optimum time cutoff value is identified. The optimum time cutoff value may be as low as 1 minute, and the determination of the value of the optimum time cutoff value depends on the amount of data, i.e., time differences, accumulated in the histograms.

Using the first histogram, the fraction of the ISPAGE messages that should be dropped may be determined by the equation:

$$\frac{A}{B},$$

where A=the number of ISPAGE messages that were received having a time difference greater than the optimum time cutoff value, and B=the number of times that the MSC receives the ISPAGE messages. Using the second histogram, the fraction of all ISPAGE messages that produce a page response that may be attempted for an optimum time cutoff value may be determined by the equation:

$$1 - \frac{C}{D},$$

where C=the number of ISPAGE messages that were received having a time difference greater than the optimum time cutoff value for instances when the mobile phone responds to the page message, and D=the number of times that the MSC receives the ISPAGE messages. Measurements from MSCs in metropolitan areas indicate that if the time cutoff is 1 hour, 70% of all received ISPAGE messages, i.e., the first histogram, can be dropped, and 97% of ISPAGE messages that produce a page response, i.e., the second histogram, can be admitted.

Those of ordinary skill in the art will readily be able to select MSCs, base stations, and data bases appropriate for use in any particular implementation of the method of excluding ineffective ISPAGE attempts.

Advantageously, MSCs using the present invention may be capable of delivering a higher number of calls to mobile phones. Also advantageously, a higher percentage of ISPAGE page attempts may produce successful results.

Figure 3:
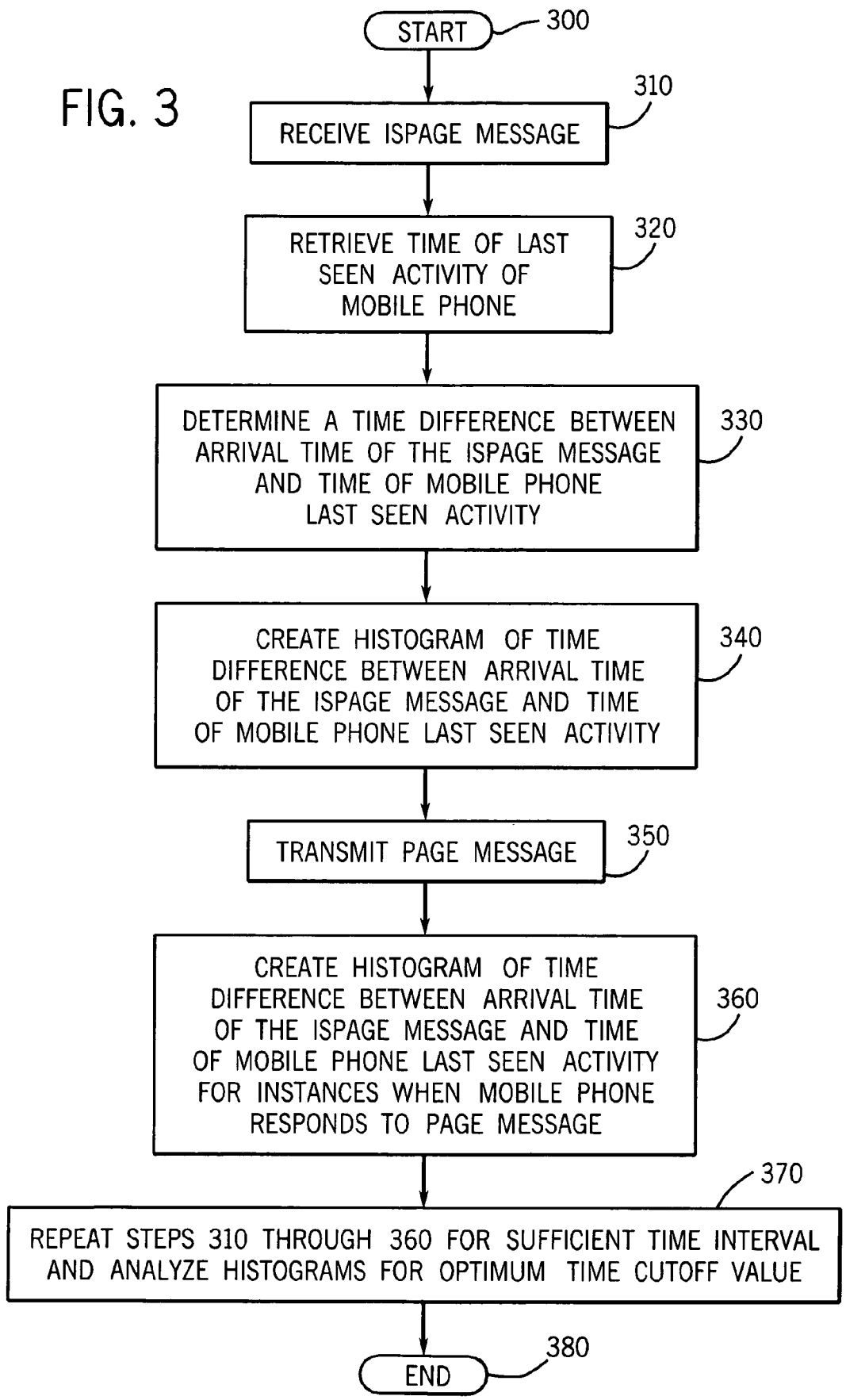
FIG. 3 shows an illustrative flow chart for a study mode method of operating the method of excluding ineffective Inter System Page (ISPAGE) attempts in accordance with the principles of the invention.

FIG. 3 shows an illustrative flow chart of a study mode of the operation of the method of excluding ineffective ISPAGE attempts in accordance with the principles of the present invention. This flow chart shows the steps necessary to determine the optimum time cutoff value. The process is entered in step 300.

In step 310 (FIG. 3), a MSC, e.g., MSC 220 (FIG. 2), receives an ISPAGE message from a last registered MSC, e.g., MSC 210, instructing MSC 220 to transmit a page message to a mobile phone, e.g., mobile phone 260.

In step 320 (FIG. 3), MSC 220 (FIG. 2) retrieves a time of a last seen activity of the specified mobile phone from a data base, e.g. data base 225.

In step 330 (FIG. 3), MSC 220 (FIG. 2) determines a time difference between an arrival time of the ISPAGE message and the time of the last seen activity of mobile phone 260.

In step 340 (FIG. 3), MSC 220 (FIG. 2) accumulates in a histogram the calculated time difference between the arrival time of the ISPAGE message and the time of the last seen activity of mobile phone 260.

In step 350 (FIG. 3), MSC 220 (FIG. 2) transmits the page message intended for mobile phone 260 via base stations 250 in response to the received ISPAGE message.

In step 360 (FIG. 3), MSC 220 (FIG. 2) accumulates in a histogram the calculated time difference between the arrival time of the received ISPAGE message and the time of the last seen activity of mobile phone 260 only for instances when mobile phone 260 responds to the page message.

In step 370 (FIG. 3), steps 310 through steps 370 are repeated over a time interval, i.e., at least one day, to allow a sufficient number of time difference counts to accumulate in the histograms. After the time interval, a service provider may analyze the histograms to determine the optimal time cutoff value.

The process is exited in step 380.

Figure 4:
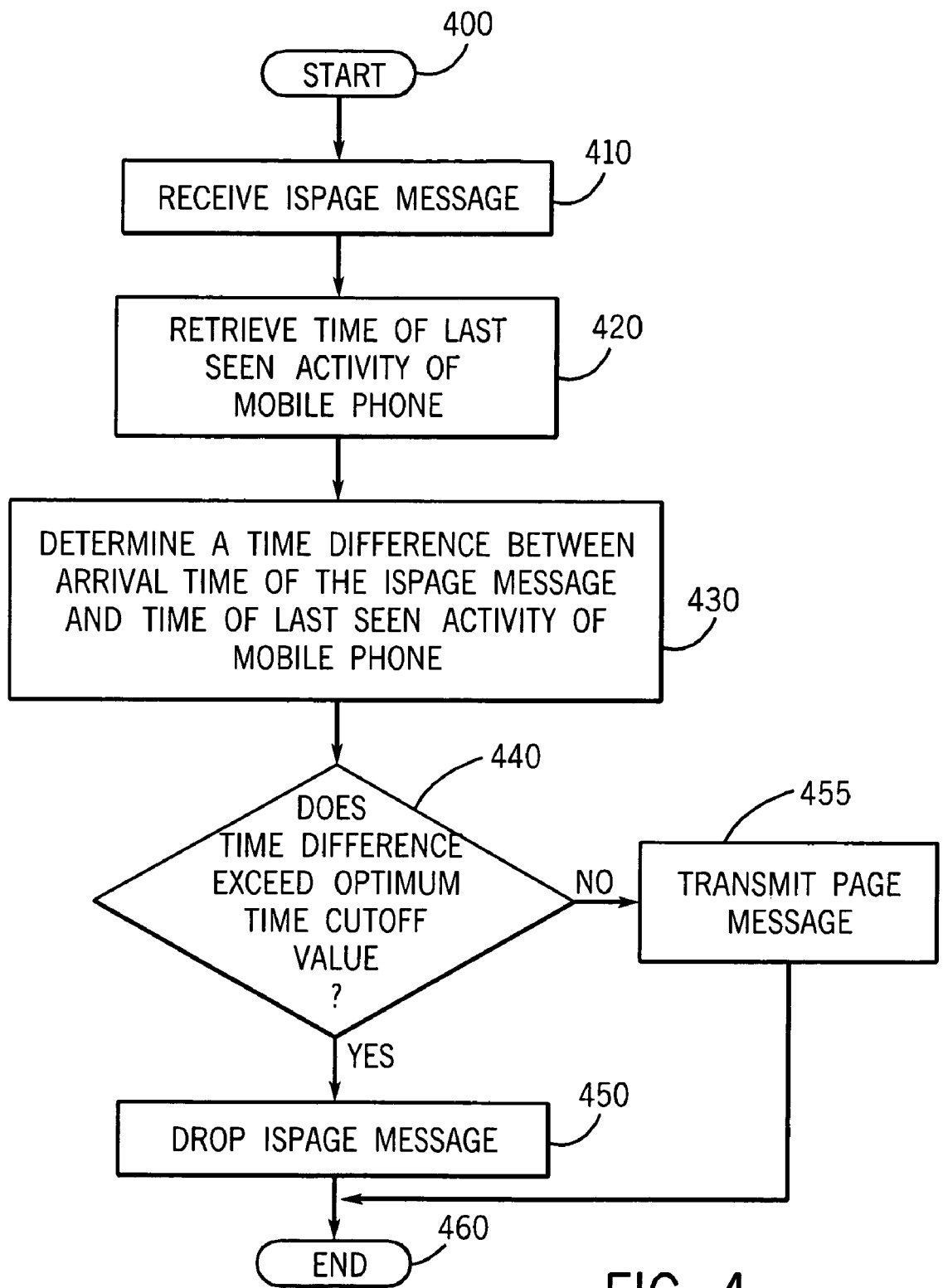
FIG. 4 shows an illustrative flow chart of the final mode operation of the method of excluding ineffective ISPAGE attempts in accordance with the principles of the present invention.

FIG. 4 shows an illustrative flow chart of the "final mode" operation of the method of excluding ineffective ISPAGE attempts in accordance with the principles of the present invention. This flow chart utilizes the optimum time cutoff value determined from the process shown in FIG. 3. The process is entered in step 400.

In step 410 (FIG. 4), a MSC, e.g., MSC 220 (FIG. 2), receives an ISPAGE message from a last registered MSC, e.g., MSC 210, instructing MSC 220 to transmit a page message to a mobile phone, e.g., mobile phone 260.

In step 420 (FIG. 4), MSC 220 (FIG. 2) retrieves a time of a last seen activity of mobile phone 260 from a data base, e.g. data base 225.

In step 430 (FIG. 4), MSC 220 (FIG. 2) determines a time difference between the arrival time of the ISPAGE message and the time of the last seen activity of mobile phone 260.

In step 440 (FIG. 4), it is necessary to determine whether the time difference determined in step 430 exceeds the optimum time cutoff value.

If the test result in conditional branch point 440 (FIG. 4) is NO, indicating that the time difference determined in step 430 does not exceed the optimum time cutoff value, then control is passed to step 455.

In step 455 (FIG. 4), MSC 220 (FIG. 2) transmits the page message to mobile phone 260. Then control is passed to step 460.

If the test result in conditional branch point 440 (FIG. 4) is YES, indicating that the time difference determined in step 430 exceeds the optimum time cutoff value, then control is passed to step 450.

In step 450 (FIG. 4), MSC 220 (FIG. 2) drops the ISPAGE message.

The process is exited in step 460.

In practice, wireless telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a differing order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method of reducing a number of page messages transmitted by a last registered mobile switching center (MSC) of a mobile communications device to one or more MSCs that border the last registered MSC, the method comprising the steps of:

receiving an Inter System Page (ISPAGE) message from the last registered MSC to transmit a page message to the mobile communications device;

retrieving a stored record of a time of a last seen activity of the mobile communications device, wherein the time of the last seen activity of the mobile communications device is stored regardless of a registration status of the mobile communications device;

determining a time difference between an arrival time of the ISPAGE message and the time of the last seen activity of the mobile communications device; and dropping the ISPAGE message if the time difference between the arrival time of the ISPAGE message and the time of the last seen activity of the mobile communications device exceeds an optimum time cutoff value.

2. The method of claim 1 wherein the time of the last seen activity of the mobile communications device is stored in a predetermined increment.

3. The method of claim 2 wherein the predetermined increment is 1 minute.

4. The method of claim 1 wherein the optimum time cutoff value is at least one minute.

5. The method of claim 1 further comprising the step of transmitting the page message to the mobile communications device if the time difference does not exceed the optimum time cutoff value.

6. An apparatus to exclude ineffective Inter System Page (ISPAGE) attempts by a mobile switching center (MSC), comprising:
   means for receiving an ISPAGE message to transmit a page message to a mobile communications device;
   means for retrieving a record of a time of a last seen activity of the mobile communications device from a data base, wherein the data base stores the time of the last seen activity of the mobile communications device regardless of a registration status of the mobile communications device;
   means for calculating a time difference between an arrival time of the ISPAGE message and the time of the last seen activity of the mobile communications device; and
   means for dropping the ISPAGE message if the time difference exceeds an optimum time cutoff value.

7. The apparatus of claim 6 wherein the optimum time cutoff value is at least one minute.

8. The apparatus of claim 6 wherein the time of the last seen activity of the mobile communications device is stored in a predetermined increment.

9. The apparatus of claim 8 wherein the predetermined increment is 1 minute.

10. The apparatus of claim 6 further comprising means for transmitting the page message to the mobile communications device if the time difference does not exceed the optimum time cutoff value.

11. The apparatus of claim 6 wherein the data base stores the time of the last seen activity for at least 6 hours.

12. A method of determining an optimum time cutoff value to reduce ineffective Inter System Page (ISPAGE) messages in a mobile switching center (MSC), the method comprising the steps of:
   a) receiving, via the MSC, an ISPAGE message to transmit a page message to a mobile communications device;
   b) retrieving, via the MSC, a record of a time of a last seen activity of the mobile communications device from a data base, wherein the data base stores the time of the last seen activity of the mobile communications device regardless of a registration status of the mobile communications devices;
   c) determining, via the MSC, a time difference between an arrival time of the ISPAGE message and the time of the last seen activity of the mobile communications device;
   d) accumulating in a first histogram, via the MSC, the time difference between the arrival time of the ISPAGE message and the time of the last activity of the mobile communications device;
   e) transmitting, via the MSC, the page message to the mobile communications device in response to the received ISPAGE message; and
   f) accumulating in a second histogram, via the MSC, the time difference between the arrival time of the ISPAGE message and the time of the last activity of the mobile communications device only for instances when the mobile communications device responds to the page message.

13. The method of claim 12 further comprising the step of storing, via a database, the time difference between the arrival time of the ISPAGE message and the time of the last activity of the mobile communications devices only for instances when the mobile communications device responds to the page message.

14. The method of claim 12 further comprising the step of:
   repeating steps a) through f) for a time interval;
   wherein a service provider employs the first histogram and second histogram to determine the optimum time cutoff value.

15. The method of claim 14 wherein the time interval is at least one day.

16. The method of claim 12 wherein the time of the last seen activity of the mobile communications device is stored in a predetermined increment.

17. The method of claim 16 wherein the predetermined increment is 1 minute.

18. The method of claim 12 further comprising the step of determining a fraction of the ISPAGE messages to drop by the equation $$\frac{A}{B}$$

where:
   A=the number of ISPAGE messages received having time differences greater than the optimum time cutoff value; and
   B=the number of times the MSC receives the ISPAGE messages.

19. The method of claim 12 further comprising the step of determining a fraction of the ISPAGE messages that produce a page response by the equation $$1 - \frac{C}{D}$$

where:
   C=the number of ISPAGE messages that were received having a time difference greater than the optimum time cutoff value for instances when the mobile phone responds to the page message; and
   D=the number of times that the MSC receives the ISPAGE messages.

20. The method of claim 14 wherein the optimum time cutoff value is at least one minute.

21. An apparatus to determine an optimum time cutoff value to reduce ineffective Inter System Page (ISPAGE) messages in a mobile switching center (MSC), comprising;
   means for receiving an ISPAGE message to transmit a page message to a mobile communications device;
   means for retrieving a record of a time of a last seen activity of the mobile communications device from a data base, wherein the data base stores the time of the last seen activity of the mobile communications device regardless of a registration status of the mobile communications devices;
   means for determining a time difference between an arrival time of the ISPAGE message and the time of the last seen activity of the mobile communications device;
   means for accumulating in a first histogram the time difference between the arrival time of the ISPAGE message and the time of the last activity of the mobile communications device;

means for transmitting the page message to the mobile communications device in response to the received ISPAGE message; and means for accumulating in a second histogram the time difference between the arrival time of the ISPAGE message and the time of the last activity of the mobile communications device only for instances when the mobile communications device responds to the page message.

22. The apparatus of claim 21 further comprising means for storing the time difference between the arrival time of the ISPAGE message and the time of the last activity of the mobile communications devices only for instances when the mobile communications device responds to the page message.

23. A method, comprising the steps of:
a) receiving an ISPAGE message to transmit a page message to a mobile communications device;
b) retrieving a record of a time of a last seen activity of the mobile communications device from a data base, wherein the data base stores the time of the last seen activity of the mobile communications device regardless of a registration status of the mobile communications devices;
c) determining a time difference between an arrival time of the ISPAGE message and the time of the last seen activity of the mobile communications device;
d) accumulating in a first histogram the time difference between the arrival time of the ISPAGE message and the time of the last activity of the mobile communications device;
e) transmitting the page message to the mobile communications device in response to the received ISPAGE message; and
f) accumulating in a second histogram the time difference between the arrival time of the ISPAGE message and the time of the last activity of the mobile communications device only for instances when the mobile communications device responds to the page message.

* * * * *